(12) United States Patent
Koshizen et al.

(10) Patent No.: US 7,221,797 B2
(45) Date of Patent: May 22, 2007

(54) IMAGE RECOGNIZING APPARATUS AND METHOD

(75) Inventors: Takamasa Koshizen, Wako (JP); Koji Akatsuka, Wako (JP); Hiroshi Tsujino, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 722 days.

(21) Appl. No.: 10/133,114

(22) Filed: Apr. 26, 2002

(65) Prior Publication Data

US 2003/0007682 A1     Jan. 9, 2003

(30) Foreign Application Priority Data

May 2, 2001   (JP)  .............................. 2001-134848
Apr. 9, 2002   (JP)  .............................. 2002-107013

(51) Int. Cl.
*G06K 9/46* (2006.01)

(52) U.S. Cl. ..................................... 382/190

(58) Field of Classification Search ................ 382/190, 382/153, 159, 195, 181, 155, 156, 157, 158, 382/160, 161
See application file for complete search history.

(56) References Cited

U.S. PATENT DOCUMENTS

| | | | | |
|---|---|---|---|---|
| 4,543,660 | A * | 9/1985 | Maeda | 382/218 |
| 5,109,425 | A * | 4/1992 | Lawton | 382/107 |
| 5,307,419 | A * | 4/1994 | Tsujino et al. | 382/153 |
| 5,500,904 | A * | 3/1996 | Markandey et al. | 382/103 |
| 5,751,838 | A | 5/1998 | Cox et al. | |
| 6,272,237 | B1 * | 8/2001 | Hashima | 382/153 |
| 6,307,959 | B1 | 10/2001 | Mandelbaum et al. | |
| 6,323,807 | B1 * | 11/2001 | Golding et al. | 342/419 |
| 6,353,679 | B1 * | 3/2002 | Cham et al. | 382/228 |
| 6,532,305 | B1 * | 3/2003 | Hammen | 382/227 |
| 6,683,677 | B2 * | 1/2004 | Chon et al. | 356/28 |
| 2002/0041324 | A1 * | 4/2002 | Satoda | 348/14.05 |

FOREIGN PATENT DOCUMENTS

| | | |
|---|---|---|
| JP | 11-134504 | 5/1999 |
| JP | 2000-171250 | 6/2000 |

OTHER PUBLICATIONS

Sheng Ma, "Fast Training of Recurrent Networks Based on the EM Algorithm" IEEE.*

* cited by examiner

*Primary Examiner*—Joseph Mancuso
*Assistant Examiner*—Alex Liew
(74) *Attorney, Agent, or Firm*—Fenwick & West LLP (57) ABSTRACT

An image recognizing apparatus and method is provided for recognizing behavior of a mobile unit accurately with an image of external environment acquired during the mobile unit is moving.

Behavior command output block 12 outputs behavior commands to cause the mobile unit 32 move. Local feature extraction block 16 extracts features of local areas of the image from the image of external environment acquired on the mobile unit 32 when the behavior command is output. Global feature extraction block 18 extracts feature of global area of the image using the features of local areas. Learning block 20 calculates probability models for recognizing behavior given to the mobile unit 32 based on the feature of global area of the image. After learning is finished, behavior of the mobile unit 32 may be recognized rapidly and accurately by applying the probability models to an image of external environment acquired in mobile unit 32 afresh.

18 Claims, 11 Drawing Sheets

GOING STRAIGHT ($\Omega_1$)

TURNING LEFT ($\Omega_2$)

FIG. 11

IMAGE RECOGNIZING APPARATUS AND METHOD

TECHNICAL FIELD

The present invention relates to image recognizing apparatus and method. More specifically, the invention relates to image recognizing apparatus and method for recognizing the behavior of mobile unit using images of external environment taken when the mobile unit is moving.

BACKGROUND OF THE INVENTION

A method for detecting optical flow is well-known in the art for recognizing behavior of mobile unit using images of external environment by calculating, for example, gradient change of image density from sequence of input images.

In Japanese Patent Application Unexamined Publication (Kokai) No. 2000-171250, a method for detecting current position of a mobile unit by means of optical flow is disclosed. According to the method, optical flow of scenes of certain course are acquired every predetermined distance when the mobile unit moves along with the course beforehand. Then relationship between the optical flow and taking point is stored. After that, optical flow of the course is newly detected and undergoes matching with all of stored optical flows. The one showing maximum matching result is selected and a point associated with the selected one is recognized as current point where the mobile unit moves.

In Japanese Patent Application Unexamined Publication (Kokai) No. H11-134504, another method is disclosed. The method comprises calculating optical flow from moving images and processing the optical flow with neural network layer to recognize the behavior of the mobile unit. The method further comprises judging necessary processing based on the recognition. According to the method, detecting the approach to the obstacle is enabled with simple neural network based on moving images.

However, in order to implement the former method, many relationships between optical flow and point in a course need to be stored by moving the mobile unit in the predetermined course beforehand.

Generally, there are some problems to recognize position and behavior of the mobile unit by feature extracting based only on moving images like the latter method. For example, since relative distance between light source and a camera on the mobile unit changes continuously as the mobile unit moves, image intensity such as lightness changes so great that accurate feature extracting is difficult. In addition, since vibration of the moving mobile unit is transmitted to the camera, accuracy of feature extraction is degraded. If a recognizing system is configured to execute smoothing process over multiple frame of images to remove bad effects due to the variation of image intensity or the vibration, computing load becomes too heavy or feature extraction becomes difficult when the image moves fast due to large time variation.

It is objective of the present invention is to provide an image recognizing apparatus and method that can recognize the behavior of a mobile unit rapidly and accurately using images of external environment taken on the mobile unit in the real application.

SUMMARY OF THE INVENTION

An image recognizing apparatus according to the invention performs learning in an on-line like fashion in the real application without executing smoothing process to remove the noise effect like conventional art, and improve robustness over variation of environment by using such noise as data for feature extraction.

The image recognizing apparatus according to the invention comprises behavior command output means for outputting behavior commands to cause a mobile unit to move and local feature extraction means for extracting features of local areas within an image of external environment acquired on the mobile unit when the behavior command is output. The apparatus further comprises global feature extraction means for extracting features of global area of the image using the extracted features of the local areas and learning means for calculating probability models to recognize behavior of the mobile unit based on the extracted features of the global area.

The local feature extraction means extracts the features of the local areas within the image by utilizing image intensities obtained by applying both positive and negative component of Gabor filters on two images. Preferably, the Gabor filters are applied on one of eight different directions respectively.

The global feature extraction means combines the features of the local areas into the global feature with the use of Gaussian functions.

It is preferable that the probability models are generated utilizing expectation maximization algorithm and supervised learning with the use of neural network, but any other learning algorithm may be used.

After the probability models are generated, high-accurate behavior recognition of the mobile unit is enabled by applying the models to an image acquired afresh. Therefore, the apparatus may comprises a behavioral recognition means for applying Bayes' rule with use of the probability model on an image acquired afresh. The behavioral recognition means further calculates confidence for each of the behavior commands to recognize behavior of the mobile unit.

It is desirable that the accuracy of the behavior recognition is always greater than a certain level. Therefore, the apparatus according to the invention further comprises a behavioral assessment means for comparing the confidence with a predetermined value to assess the recognized behavior, an attention generation means for generating attentional demanding which demands to cause the probability model to be updated based on the result of the assessment, and an attentional modulation means for changing specified parameter of the global feature extraction means in response to the attentional demanding.

In this case, the learning means recalculates probability model after the parameter is changed. Then the behavior recognition means recognizes behavior of the mobile unit again with the probability models.

Other features and embodiments of the invention will be apparent for those skilled in the art by reading the following detailed description referring to the attached drawings.

DETAILED DESCRIPTION OF THE PREFERRED EMBODIMENTS

Now some preferred embodiments of the invention will be described below with reference to the attached drawings.

Figure 1:
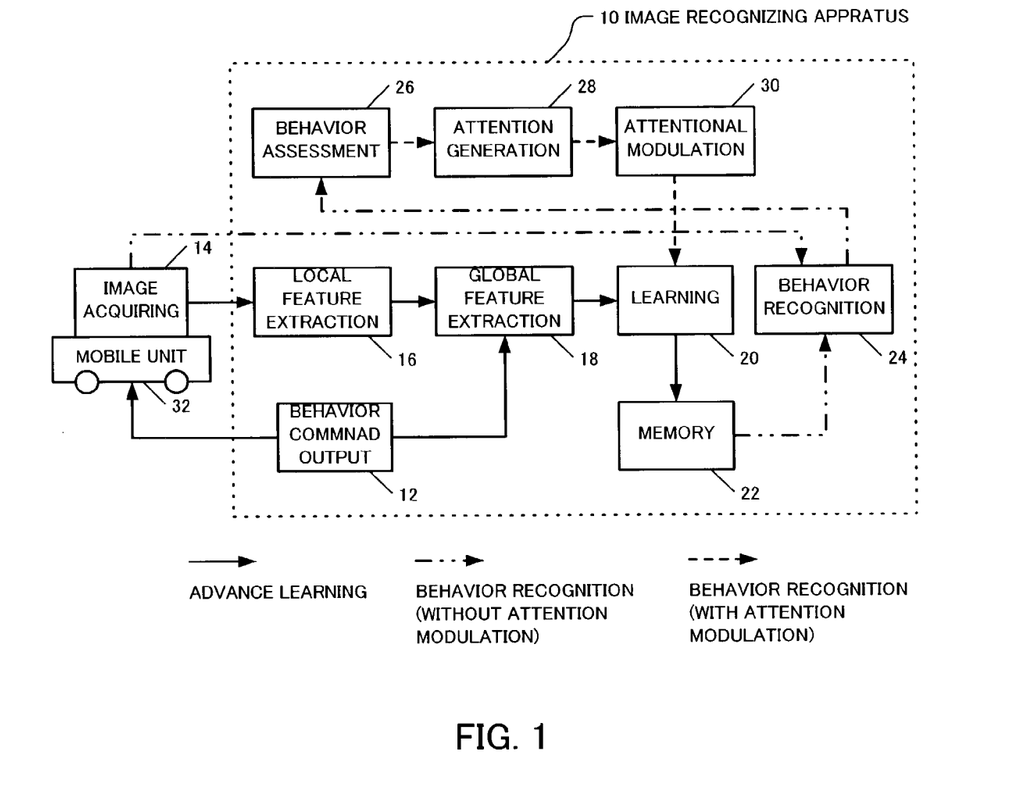
FIG. 1 shows functional block diagram of the image recognizing apparatus according to one embodiment of the invention.

FIG. 1 is a block diagram of image recognizing apparatus 10 according to one embodiment of the present invention. Image recognizing apparatus 10 comprises a behavior command output block 12, a local feature extraction block 16, a global feature extraction block 18, a learning block 20, memory 22, a behavior recognition block 24, a behavior assessment block 26, an attention generation block 28 and an attentional modulation block 30.

The recognizing process of the image recognizing apparatus 10 comprises two parts. First part is advance learning part, where relationship is learned between behavior of a moving mobile unit and images taken by a camera equipped on the mobile unit. Second part is behavior recognizing part, where behavior of the mobile unit is recognized based on newly taken image using the knowledge learned in the advance learning part.

In the advance learning part, the behavior command output block 12, the local feature extraction block 16, the global feature extraction block 18, the learning block 20 and the memory 22 are employed. In the behavior recognizing part, in addition to those blocks, the behavior recognition block 24, the behavior assessment block 26, the attention generation block 28 and the attentional modulation block 30 are employed.

At first, each block employed in the advance learning part is described.

The behavior command output block 12 outputs behavior commands to a mobile unit 32. As used herein, term "behavior command" means a command to cause the mobile unit to go straight, to make right turn, or left turn. The behavior commands are output depending on instruction signal transmitted from external device. In alternative embodiment, the behavior command output block 12 may read pre-stored sequence of behavior commands and then output them. In a further alternative embodiment, the mobile unit 32 recognizes behavior of itself based on acquired image and determines which behavior to take next, and the behavior command output block 12 outputs the behavior command depending on the determination.

The behavior command is sent to mobile unit 32 by radio or cable broadcasting and causes it to move (for example, go straight or turn left/right). The behavior command is also supplied to global feature extraction block 18 and used for generation of global features described below.

Provided on the mobile unit 32 is an image acquisition block 14 such as a charge-coupled device (CCD) camera, which acquires image I(t) of external environment of the mobile unit 32 at time t every preset interval and supplies it to the local feature extraction block 16.

The local feature extraction block 16 extracts feature vector of each local area of the image I(t). As used herein, the term "local area" means one of small areas into which whole image I(t) acquired by the image acquisition block 14 is divided such that each small area has same dimension. Each local area is composed of plurality of pixels. In the present embodiment, the local feature extraction block 16 calculates optical flow from two images I(t), I(t+1) consecutive in time and used the optical flow to generate feature vector for each local area (hereinafter referred to as "local feature"). The extracted local features are supplied to the global feature extraction block 18.

The global feature extraction block 18 combines all of the local features of the image I(t) and extracts one new feature vector, which is referred to as "global feature" hereinafter. The global feature is supplied to the learning block 20.

The learning block 20 implements learning based on the global feature and generates probability models described below. In the present embodiment, well-known expectation maximization algorithm and supervised learning with the use of neural network are used for such learning. Alternatively, other learning algorithm may be used. The probability models generated by the learning are stored in the memory 22 and used for recognition of behavior of the mobile unit 32 in the behavior recognizing part.

After the advance learning part is finished, the image recognizing apparatus 10 provides functionality of recognizing the behavior of the mobile unit 32 accurately by applying the probability models on an image acquired afresh by the image acquisition block 14.

Now each block employed in the behavior recognizing part is described.

The image acquisition block 14 acquires image I(t) of external environment of the mobile unit 32 at time t for every preset interval as is noted above, and then supplies it to the behavior recognition block 24 this time. The behavior recognition block 24 applies the probability model stored in the memory 22 on the supplied image I(t). The block 24 then calculates "confidence" for each of behavior commands and recognizes the behavior of the mobile unit 32 based on the confidence.

The confidence is supplied to the behavioral assessment block 26, which calculates logarithmic likelihood of the confidence. If the logarithmic likelihood of the confidence is larger than a specified value, no more operation is generated. If the logarithmic likelihood of the confidence is equal to or less then the predetermined value, the attention generation block 28 generates attentional demanding signal and supplies it to the attentional modulation block 30.

Upon receiving the attentional demanding, the attentional modulation block 30 changes (or modulates) a specified parameter in the learning algorithm and causes the learning block 20 to update the probability models, which is stored in the memory 22. The behavior recognition block 24 uses the updated probability models and recognizes the behavior of the mobile unit 32 again. Thus, the accuracy of behavior recognition will be expected to be more than a certain level.

While the image acquisition block 14 needs to be installed on the mobile unit 32, it is not necessary for the image recognizing apparatus 10 to be installed on the mobile unit 32 and may be located in external place. In case of being installed on the mobile unit 32, the image recognizing apparatus 10 may be either integral with or separate from the image acquisition block 14. Communication between the image acquisition block 14 and the image recognizing apparatus 10 may be done via cable or radio transmission.

The image recognizing apparatus 10 may be all or partly implemented by, for example, executing on a computer program configured to execute processes noted above.

Figure 2:
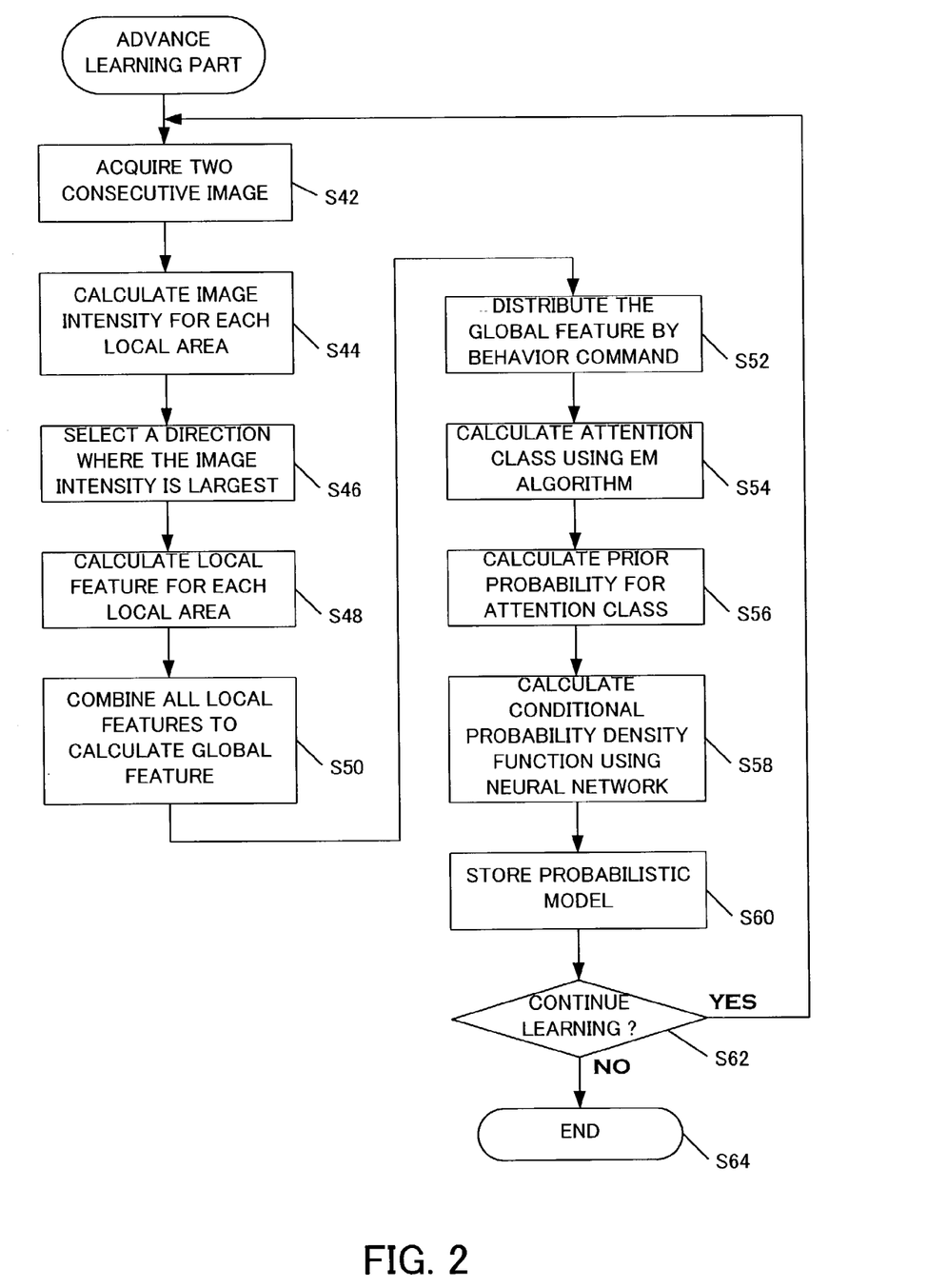
FIG. 2 is a flow chart illustrating advance learning part of image recognizing method according to the invention.

Now process in the advance learning part are described in detail with reference to FIG. 1 and FIG. 2. FIG. 2 is a flowchart illustrating the process of the advance learning part.

When a mobile unit 32 moves in accordance with behavior command from the behavior command output block 12, the image acquisition block 14 acquires image I(t) at time t while the mobile unit 32 moves around in a given environment (step S42). The local feature extraction block 16 extracts local features from the acquired images I(t) and I(t+1) (step S44 . . . S48). More specifically, Gabor filters are used to calculate image intensity $E_i(x_t,y_t)$ by being applied to each local area image within the acquired images. A plurality of image intensities $E_i(x_t,y_t)$ in each direction of the Gabor filter are obtained for each local area according to the following Eq. (1) (step S44).

$$E_i(x_t,y_t) = Img_{(t)} \cdot Gbr_i(+) + Img_{(t+1)} \cdot Gbr_i(-) \qquad (1)$$

Here $Gbr_i(+)$ and $Gbr_i(-)$ represent positive component and negative component of the Gabor filter respectively. Subscript "i" represents direction of the Gabor filter. In the embodiment, "i" ranges from 1 to 8. $Img_{(t)}$ represents a local area image within the image I(t) acquired at certain time t and $Img_{(t+1)}$ represents a local area image within the image I(t+1) acquired at consecutive time t+1. $(x_t,y_t)$ shows coordinate of pixel in a local area at time t. Therefore, $E_i(x_t,y_t)$ represents image intensity in direction i of the local area image.

Direction for applying Gabor filters and the number of Gabor filters are arbitrary. In the embodiment, imitating receptive field of visual sensation facility of human being, Gabor filters in eight directions extending radially in equal angles from center of whole image are employed.

The local feature extraction block 16 selects a direction j having the largest image intensity from the plurality of image intensities $E_i(x_t,y_t)$ (i=1, . . . , 8) for each local area according to following Eq. (2) (step S46).

$$j = \mathrm{argmax}_i E_i(x_t,y_t) \qquad (2)$$

It should be noted that selected directions j will be different between local areas.

Then the local feature extraction block 16 applies Gauss function to the largest image intensity $E_j(x_t,y_t)$ according to following Eq. (3) to obtain local feature $\Psi_j(x_t,y_t)$ for each local area (step S48).

$$\Psi_j(x_t, y_t) = \exp\left(-0.5 \frac{(E_j(x_t, y_t) - \mu_j)^2}{\sigma_j^2}\right) \qquad (3)$$

In Eq. (3), "$\mu_j$" is an average of image intensities $E_j(x_t,y_t)$. "$\sigma_j$" is variance of these image intensities $E_j(x_t,y_t)$. Therefore, the local feature $\Psi_j(x_t,y_t)$ means the expression of probability density distribution for image intensity $E_j(x_t,y_t)$ in each local area image with regard to direction having the largest intensity. Local features $\Psi_j(x_t,y_t)$ are calculated as many as the number of local areas. It should be noted that the direction j where local feature $\Psi_j(x_t,y_t)$ is calculated for each local area is different.

Upon receiving the local features $\Psi_j(x_t,y_t)$ from the local feature extraction block 16 and the behavior command from the behavior command output block 12, the global feature extraction block 18 combines all local features $\Psi_j(x_t,y_t)$ with regard to each largest direction j of the image intensity to obtain global feature $\rho_j(\chi_t|l)$ according to Eq. (4) (step S50).

$$\rho_j(\chi_t|l) = \int_{\chi_t \in \Re^2} \Psi_j(x_t,y_t) dx_t dy_t \quad (j=1, \ldots, 8) \qquad (4)$$

Here, "$\chi_t$" means two-dimensional Cartesian coordinate of $(x_t,y_t)$.

Calculated global feature $\rho_j(\chi_t|l)$ is distributed to one of classes according to the behavior command output by the behavior command output block 12 when the image I(t) is acquired, and stored in memory (step S52). Here "l" represents behavior command. In the present embodiment where three behavior commands (going straight, a left turn and a right turn) are used, l=1 corresponds to a behavior command of going straight, l=2 to a behavior command of turning left, and l=3 to a behavior command of turning right. Therefore, the global features $\rho_j$ when the mobile unit is going straight (l=1), turning left (l=2) or turning right (l=3) are stored in different classes.

These classes are called "attention class" $\Omega_l$. As used herein, term "attention class" is for updating learning result efficiently by noticing certain feature when new feature is presented, not reflecting all of them. The attentional class is identical to the probability model of different behaviors.

It should be noted that the number of attention class is not limited to three but any number of the attention class may be employed correlating to the number of behavior commands.

Because the global feature $\rho_j(\chi_t|l)$ is calculated in association with behavior command for image acquired at time t, a lot of sets of global feature for eight directions are stored by behavior command.

Figure 3:
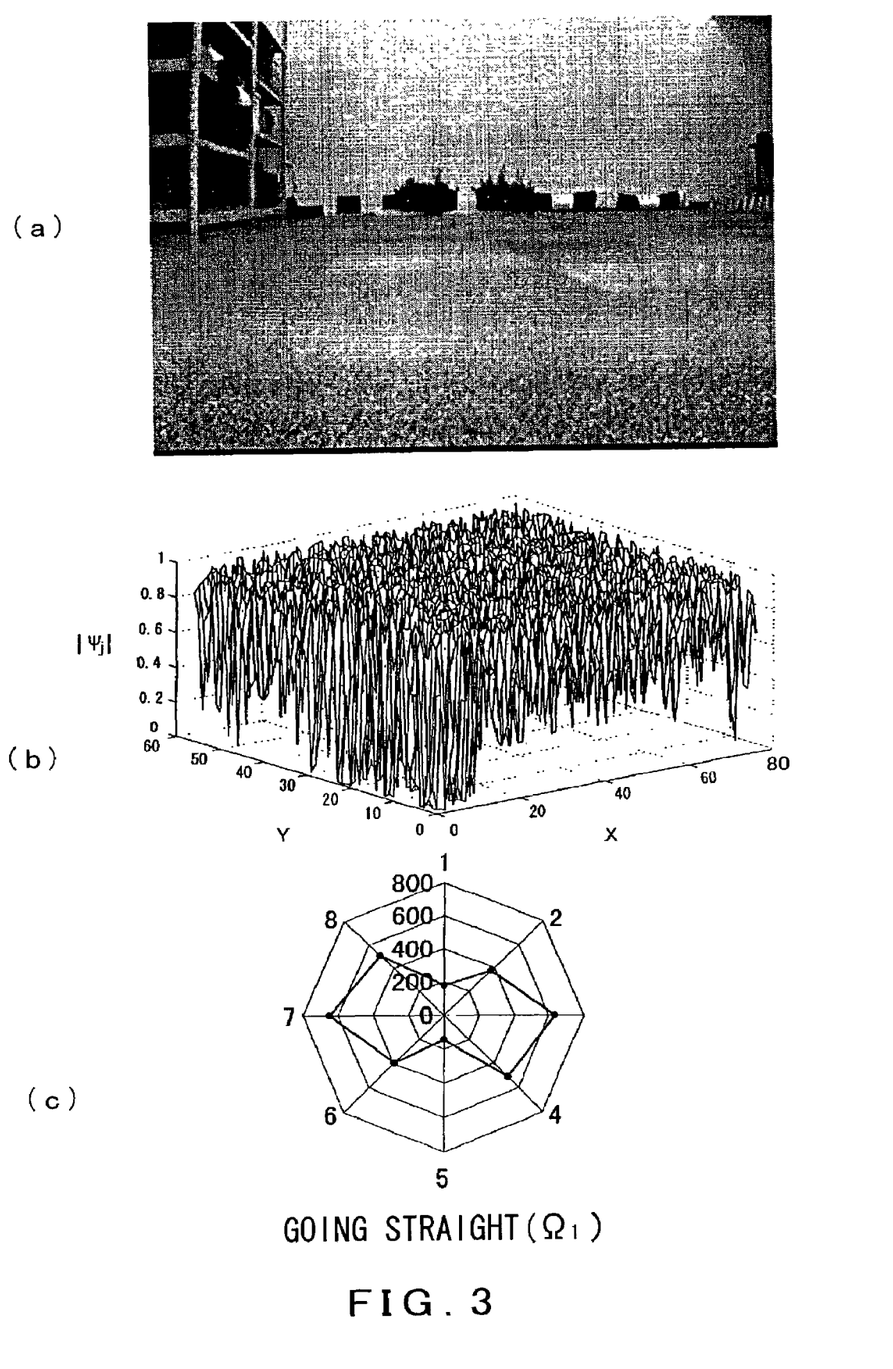
FIG. 3 are drawings illustrating image recognition result in going straight of a mobile unit ($\Omega_1$)
Figure 4:
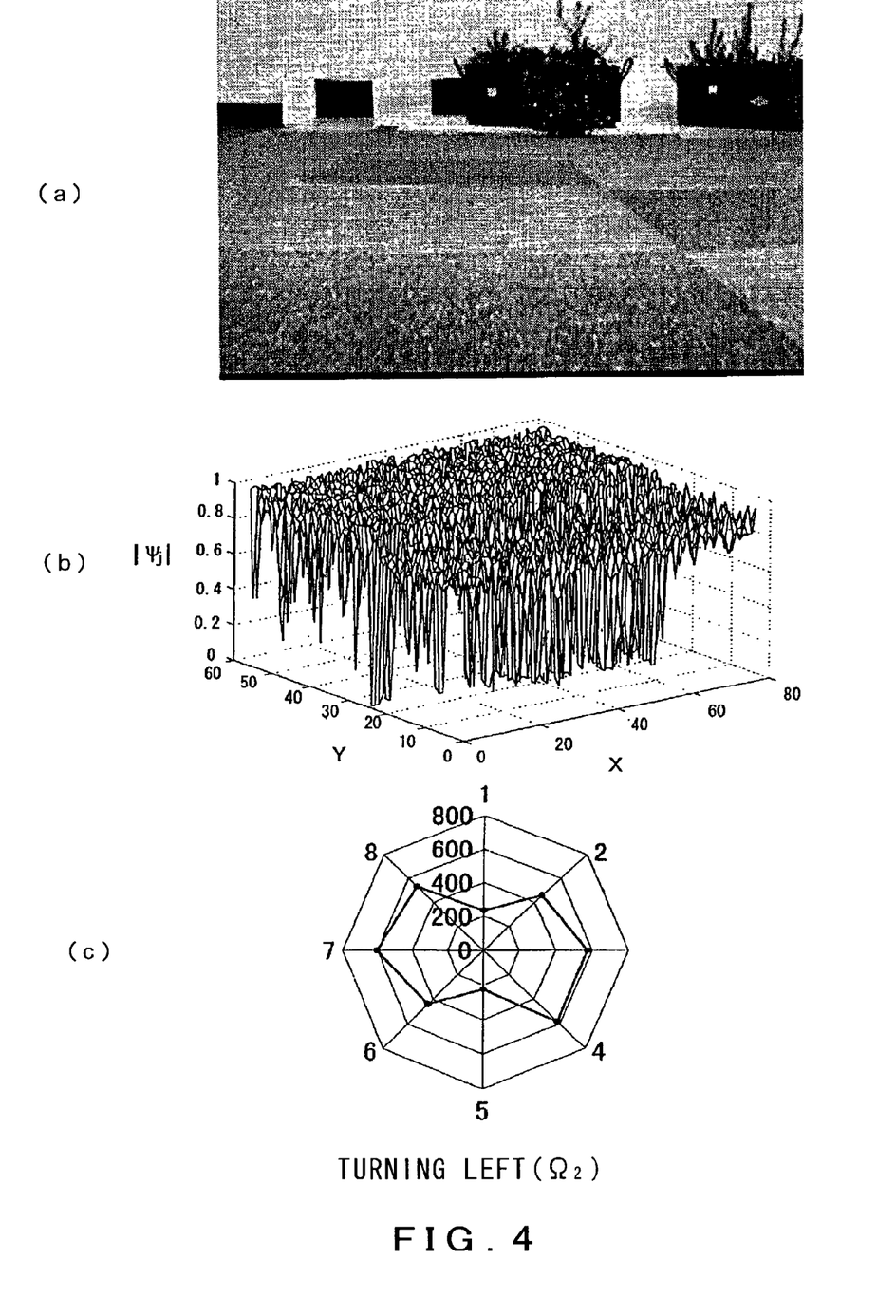
FIG. 4 are drawings illustrating image recognition result in a left turn of a mobile unit ($\Omega_2$)
Figure 5:
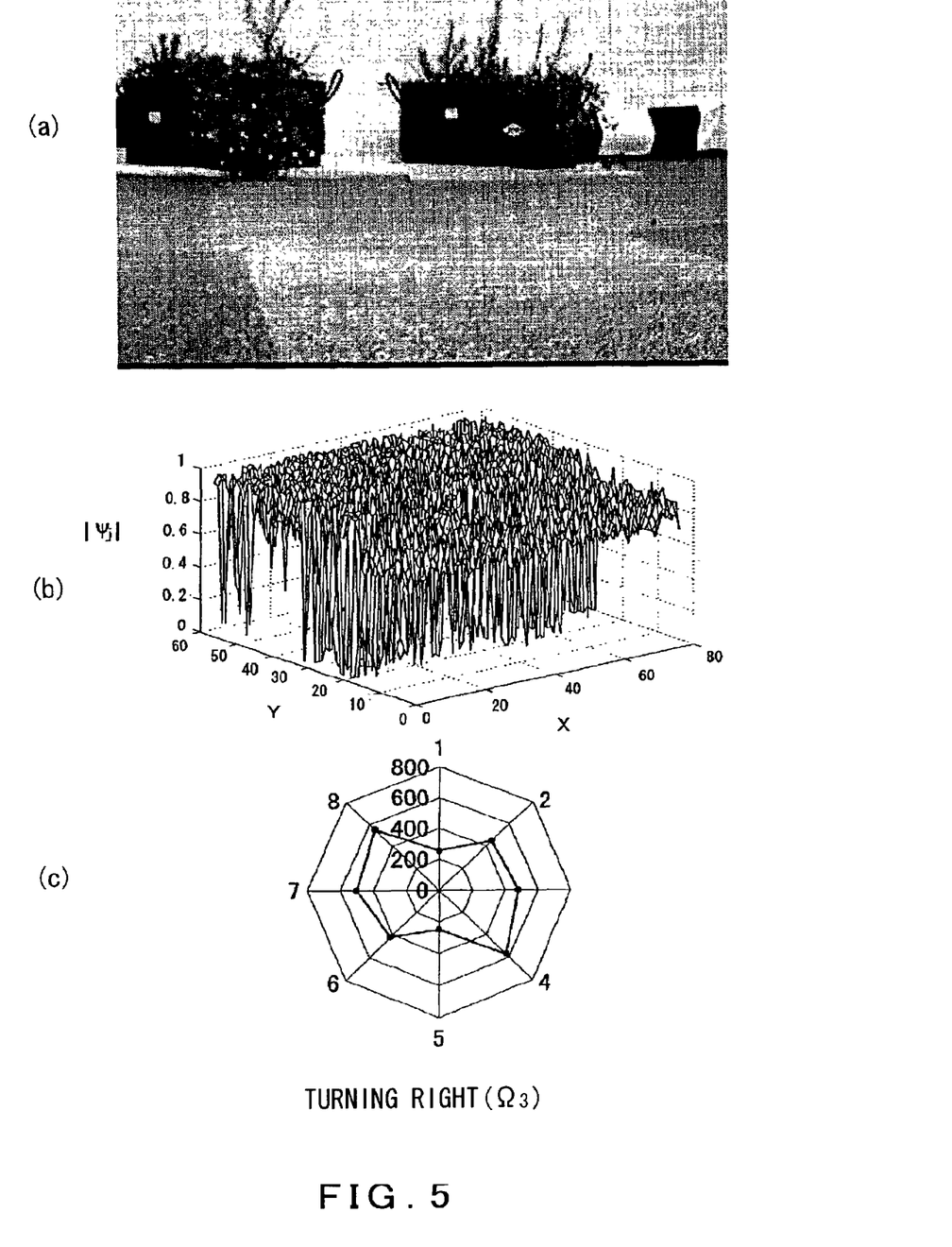
FIG. 5 are drawings illustrating image recognition result in a right turn of a mobile unit ($\Omega_3$)

FIG. 3 to FIG. 5 illustrate the relationship among original (acquired) image I(t), local feature $\Psi_j(x_t,y_t)$ and global feature $\rho_j(\chi_t|l)$ in the environment where the mobile unit 32 runs toward obstacles. FIG. 3 correspond to the case when the mobile unit 32 goes straight. FIG. 4 correspond to the case when the mobile unit 32 turns left, and FIG. 5 correspond to the case when the mobile unit 32 turns right, respectively.

Upper part (a) of FIG. 3 to FIG. 5 show images of obstacles acquired at the place when the car is located in the environment. Middle part (b) of FIG. 3 to FIG. 5 show graph of local feature when one direction of the Gabor filter is applied to a whole image, calculated by the Eq.(2) and Eq.(3). In this example, the whole image is divided in 77*57 local areas. Lower part (c) of FIG. 3 to FIG. 5 are the Polar-shaped maps which depict the global feature $\rho_j$ calculted by Eq. (4), consisting of the eight direction of the Gabor filter. In part (c), numerals of 1 to 8 correspond to application direction of the Gabor filter (upward direction, right-upward direction, or the like).

Comparing the polar-shaped maps in part (c) of FIG. 3 to FIG. 5, feature on behavior (behavior command l) of mobile unit 32 may be recognized.

Back to FIG. 2, after storing the global feature $\rho_j(\chi_t|l)$ in step S52, the learning block 20 starts learning based on the global feature $\rho_j(\chi_t|l)$ (step S54 to S58). More specifically, Expectation Maximization algorithm (EM algorithm) and supervised learning with the use of neural network are employed to obtain probability models for recognizing behavior of the mobile unit 32.

The EM algorithm is an iterative algorithm for estimating parameter θ which takes maximum likelihood when observed data is viewed as incomplete data. Assuming mean of the observed data is represented as $\mu^l$ and covariance as $\Sigma^l$, the parameter θ may be represented as $\theta(\mu^l, \Sigma^l)$. EM algorithm is initiated with appropriate initial values of $\theta(\mu^l, \Sigma^l)$. Then the parameter $\theta(\mu^l, \Sigma^l)$ is updated one after another by iterating Expectation (E) step and Maximization (M) step alternately.

On the E step, conditional expected value $\phi(\theta|\theta^{(k)})$ is calculated according to following Eq. (5)

$$\phi(\theta|\theta^{(k)}) = \Sigma_i \Sigma_l p(\rho^l | \Omega_i; \theta^{(k)}) \log(p(\rho^l, \Omega_i; \theta^{(k)})) \qquad (5)$$

Then on the M step, parameters $\mu^l$ and $\Sigma^l$ for maximizing $\phi(\theta|\theta^{(k)})$ are calculated by following Eq. (6) and comprise a new estimated value $\theta^{(k+1)}$.

$$\theta^{(k+1)} = \mathrm{argmax}_\theta \phi(\theta, \theta^{(k)}) \qquad (6)$$

After repeating E steps and M steps, conditional expected value $\phi(\theta|\theta^{(k)})$ is obtained. By partial differentiating this value $\phi(\theta|\theta^{(k)})$ on $\theta^{(k)}$ and letting a result equal to zero, parameters $\mu^l$ and $\Sigma^l$ may be finally calculated. More detailed explanation will be omitted because this EM algorithm is well known in the art.

By using EM algorithm, global feature of each attention class $\Omega_l$ can be expressed by normal distribution (step S54).

The global feature extraction block 18 uses those calculated $\mu^l$ and $\Sigma^l$ in following Eq. (7) to calculate prior probability $\bar{p}(\rho^l | \Omega_l)$, which means the probability that global feature $\rho_j(\chi_l | l)$ belongs to class $\Omega_l$ of behavior command l (step S56).

$$\bar{p}(\rho^l | \Omega_l) = \sum_{m=1}^{M} \frac{\alpha_{m\rho^l}}{(2\pi)^{N/2} \sqrt{|\Sigma_{m\rho^l}|}} \exp\left(-\frac{1}{2}(\rho^l - \mu)^T \sum_{m\rho^l}^{-1} (\rho^l - \mu)\right) \qquad (7)$$

Here, N is the number of dimensions of global feature $\rho_j(\chi_t | l)$.

Next, supervised learning with the use of neural network will be described. In this learning, conditional probability density function $p(I(t)|\Omega_l)$ is calculated for image I(t) with attention class as supervising signal (step S58).

Figure 6:
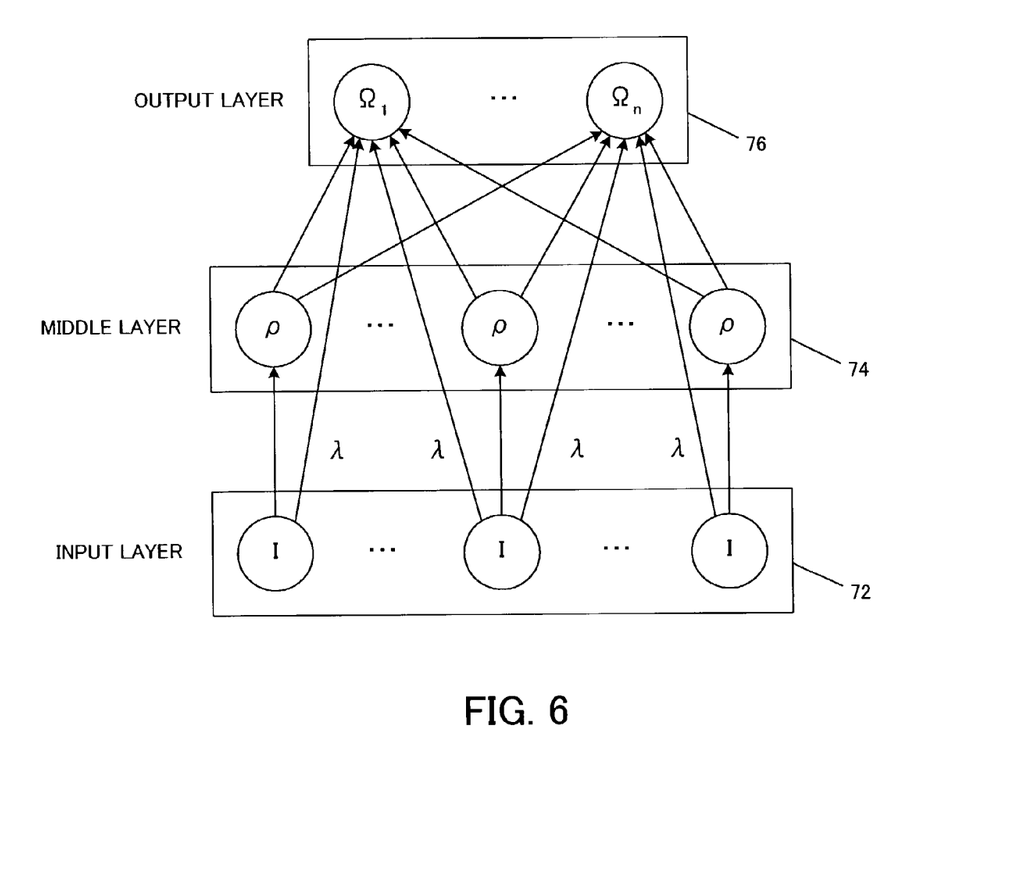
FIG. 6 is one example of hierarchical neural network employed by supervised learning.

FIG. 6 shows one example of hierarchical neural network used for the supervised learnin. This hierarchical neural network has three layer of node. Nodes in input layer 72 correspond to (original) images I(t), nodes in middle layer 74 to global features $\rho_j(\chi_t | l)$, and nodes in output layer 76 to attention classes $\Omega_l$, respectively. Although only three nodes are illustrated on the input layer 72 for simple illustration, there are actually as many nodes as the number of images I(t). Likewise, on the middle layer 74, there are nodes as many as nodes on the input layer 72. Nodes on the middle layer 74 correspond to nodes on the input layer 72 one by one. Nodes on the output layer 76 are generated as many as the number of attention class $\Omega_l$ (three in this embodiment).

In FIG. 6, "λ" denotes synaptic weight of the hierarchical neural network. The probability that global feature $\rho_j(\chi_t | l)$ belongs to each attention class $\Omega_l$ is obtained by EM algorithm, and global feature $\rho_j(\chi_t | l)$ is calculated for a set of images I(t) and I(t+1) one by one, so probability relationship (that is, "λ" in FIG. 6) between image I(t) and attention class $\Omega_l$ is determined by repeating the supervised learning with attention class $\Omega_l$ as supervising signal. More specifically, this probability relationship is conditional probability density function $p(I(t)|\Omega_l)$. More detailed explanation will be omitted because this hierarchical neural network is well known in the art.

By such supervised learning with neural network, direct relation between image I(t) and attention class $\Omega_l$, that is, conditional probability density function $p(I(t)|\Omega_l)$ may be obtained.

Process in steps S54 to S58 are executed every behavior command l. Therefore, in the present embodiment, prior probability $\bar{p}(\rho^l | \Omega_l)$ and conditional probability density function $p(I(t)|\Omega_l)$ (these are called "probability model" integrally) are calculated for behavior command l=1, 2, and 3.

Probability model calculated by learning block 20 is stored in memory 22 (step S 60). If advance learning is continued, "yes" is selected in step S62 and a series of processes from step S42 to S60 is repeated, and then probability model is updated. While the mobile unit 32 is moving, advance learning is executed for all of images I(t) acquired in time t. When probability model is judged to be highly accurate enough to recognize behavior of mobile unit 32 (for example, process is completed for predetermined number of images I(t)), the process ends (step S64).

Figure 7:
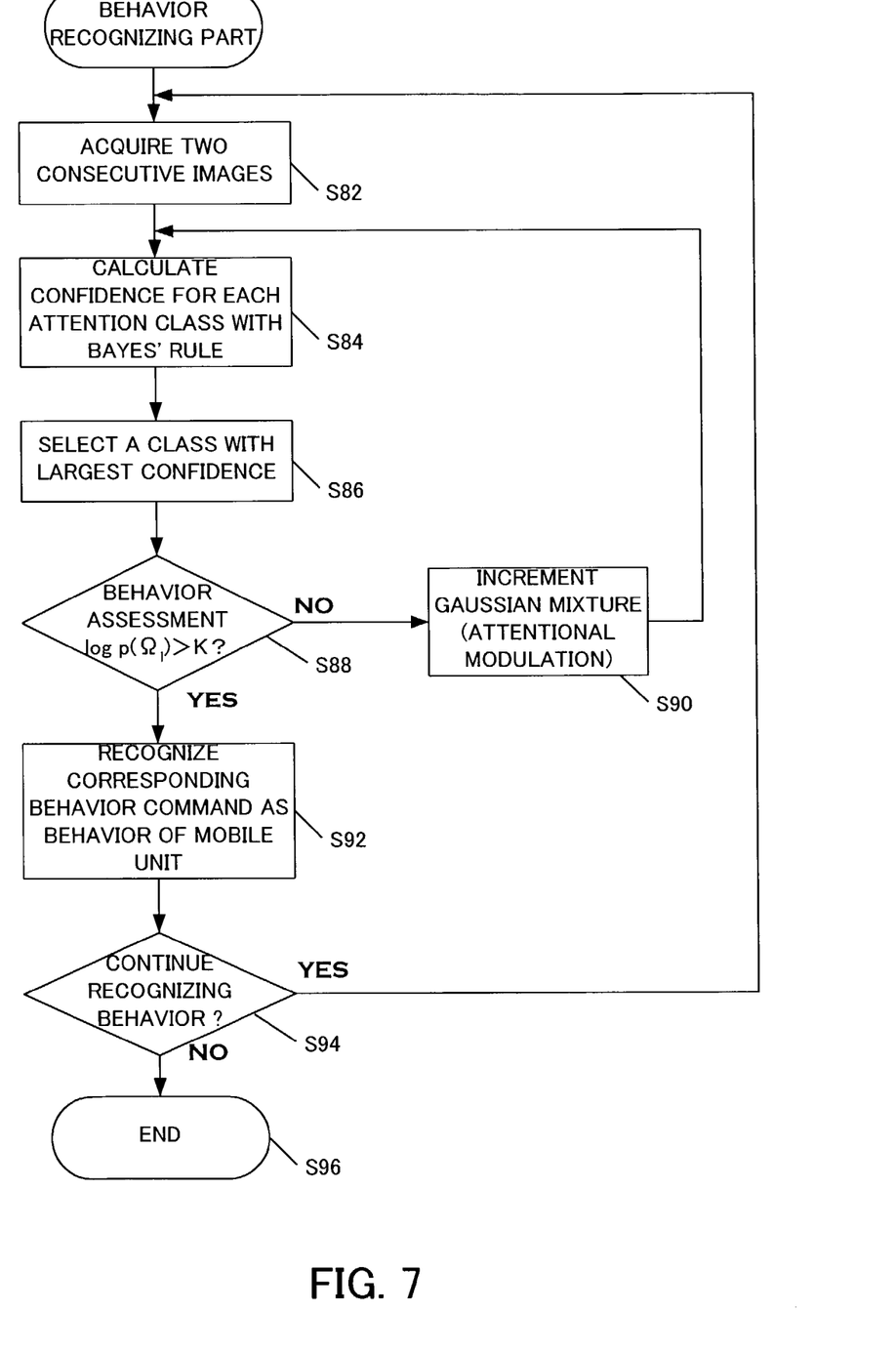
FIG. 7 is a flow chart illustrating behavior recognizing part of image recognizing method according to the invention.

Referring to FIG. 1 and FIG. 7, the behavior recognizing part will be described in detail. FIG. 7 is a flow chart illustrating of process of the behavior recognizing part.

The image acquisition block 14 acquires two of new images at time t every preset interval (step 82). Probability models (prior probability $\bar{p}(\rho^l | \Omega_l)$ and conditional probability density function $p(I(t)|\Omega_l)$) calculated in the advance learning part are used in following Bayes' rule and confidence $p(\Omega_l(t))$ for each attention class $\Omega_l$ (l=1,2,3) is calculated (step S84). This confidence $p(\Omega_l(t))$ means the probability that the new image I(t) belongs to each attention class $\Omega_l$.

$$p(\Omega_l(t)) = \frac{\bar{p}(\rho^l | \Omega_l(t)) p(I(t) | \Omega_l(t))}{\sum_k \bar{p}(\rho^l | \Omega_k(t)) p(I(t) | \Omega_k(t))} \qquad (8)$$

Then, among three calculated confidences p $(\Omega_1(t))$, p $(\Omega_2(t))$, and $p(\Omega_3(t))$, the largest one is selected (step S86).

The behavior assessment block 26 determines whether logarithmic likelihood of confidence $p(\Omega_l(t))$ is larger than a predetermined value K (step S88). If log p $(\Omega_l(t)) > K$, behavior command l corresponding to attention class $\Omega_l$ of which the confidence is largest is recognized as the behavior of the mobile unit 32 (step S92). Otherwise, log $p(\Omega_l(t)) \leq K$, the attention generation block 28 generates attentional demanding. The attentional modulation block 30 increments gaussian mixture "m" in Eq. (7) by specified value (that is, attentional modulation) (step S90). And in the learning block 20, a series of process in steps S56 to S60 in FIG. 2 is carried out again and the probability models (prior probability $\bar{p}-(\rho|\Omega_l)$ and conditional probability density function $p(I(t)|\Omega_l)$ are updated.

The process goes back to step S84 and repeats steps S84 to S88. Thus, gaussian mixture m is increased until logarithmic likelihood log $p(\Omega_l(t))$ excesses the predetermined value K. In alternative embodiment, once-generated probability model may be always used without updating process.

As discussed above, the image recognizing apparatus according to the invention does not recognize the behavior of the mobile unit based only on the image. Instead, since the image recognizing apparatus first complete the learning on the relationship between the global feature extracted from the image and behavior command and then recognizes the behavior using the learning result, the apparatus can recognize the behavior of the mobile unit rapidly and accurately in real application.

In addition, in the case of the mobile unit 32 can not move correctly in accordance with supplied behavior command due to such as error-mounted wheels, the image recognizing apparatus may get the real moving status of the mobile unit according to the behavior recognizing process.

Figure 8:
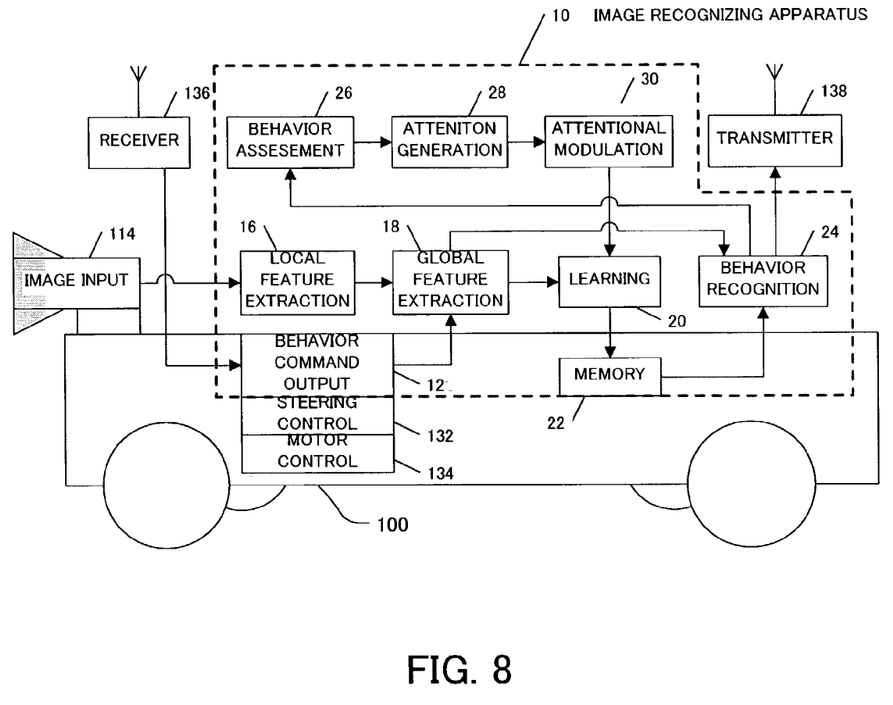
FIG. 8 is a block diagram illustrating components of an RC car which employed image recognizing apparatus according to the invention.

Now one example of the invention will be described. FIG. 8 shows a block diagram of radio control car (hereinafter referred to as "RC car") 100 that carried image recognizing apparatus 10 of the present invention. Blocks with same numerals as blocks in FIG. 1 have similar function. In addition to the image recognizing apparatus 10, on the RC car 100 is provided an image input camera 114 to acquire images, a steering control block 132 and a motor control block 134 for controlling the behavior of the RC car 100 according to the behavior command, and receiver 136 and transmitter 138 for communicating with outside device.

The receiver 136 receives behavior command signal from the outside device and supplies it to the behavior command output block 12. The RC car 100 makes going straight, left turn, or right turn in accordance with the behavior command. The transmitter 138 transmits behavior of RC car 100 recognized by the behavior recognition block 24 to the outside device.

After completing advance learning part, the result of behavior recognition for 24 frames of image is described as follows.

Figure 9:
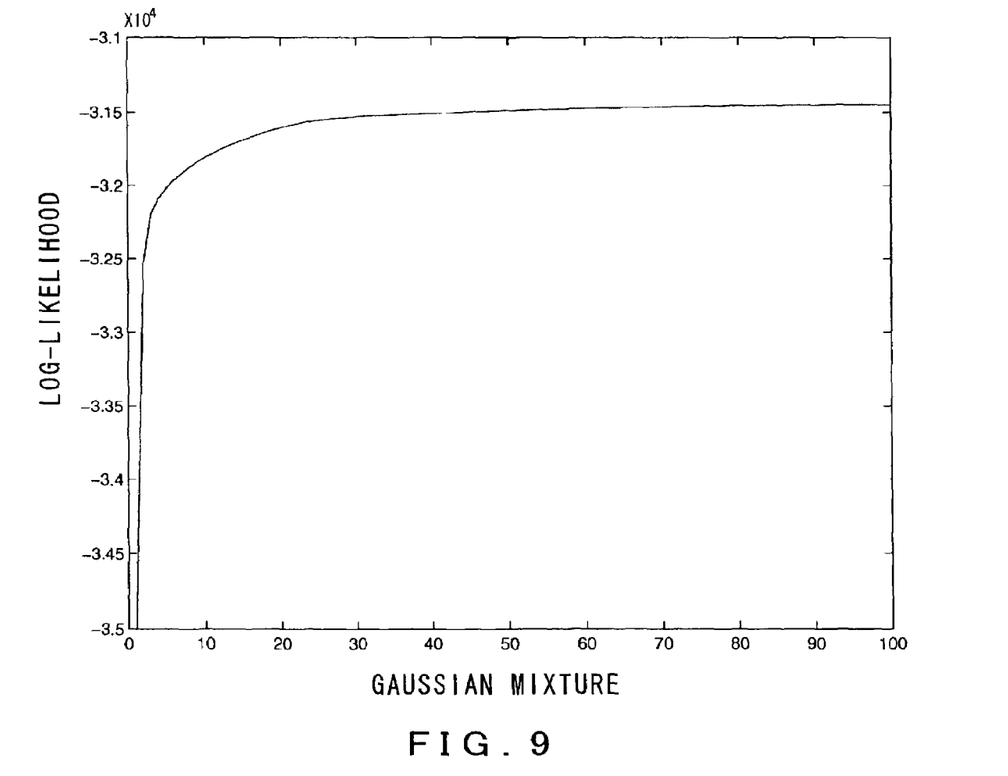
FIG. 9 shows change of logarithmic likelihood of confidence.

FIG. 9 is an exemplar illustrating change of logarithmic likelihood log p ($\Omega_i(t)$) of confidence for an attention class. Horizontal axis expresses the number of gaussian mixture m of Eq. (7) and vertical axis expresses logarithmic likelihood log p($\Omega_i(t)$) of confidence. It can be understood that the logarithmic likelihood becomes saturated when the number of Gaussian mixture m reaches about 50. Larger logarithmic likelihood for an attention class for each image means that the image recognizing apparatus 10 recognizes the probability as sufficiently high that the RC car 100 takes the behavior corresponding to that attention class.

Figure 10:
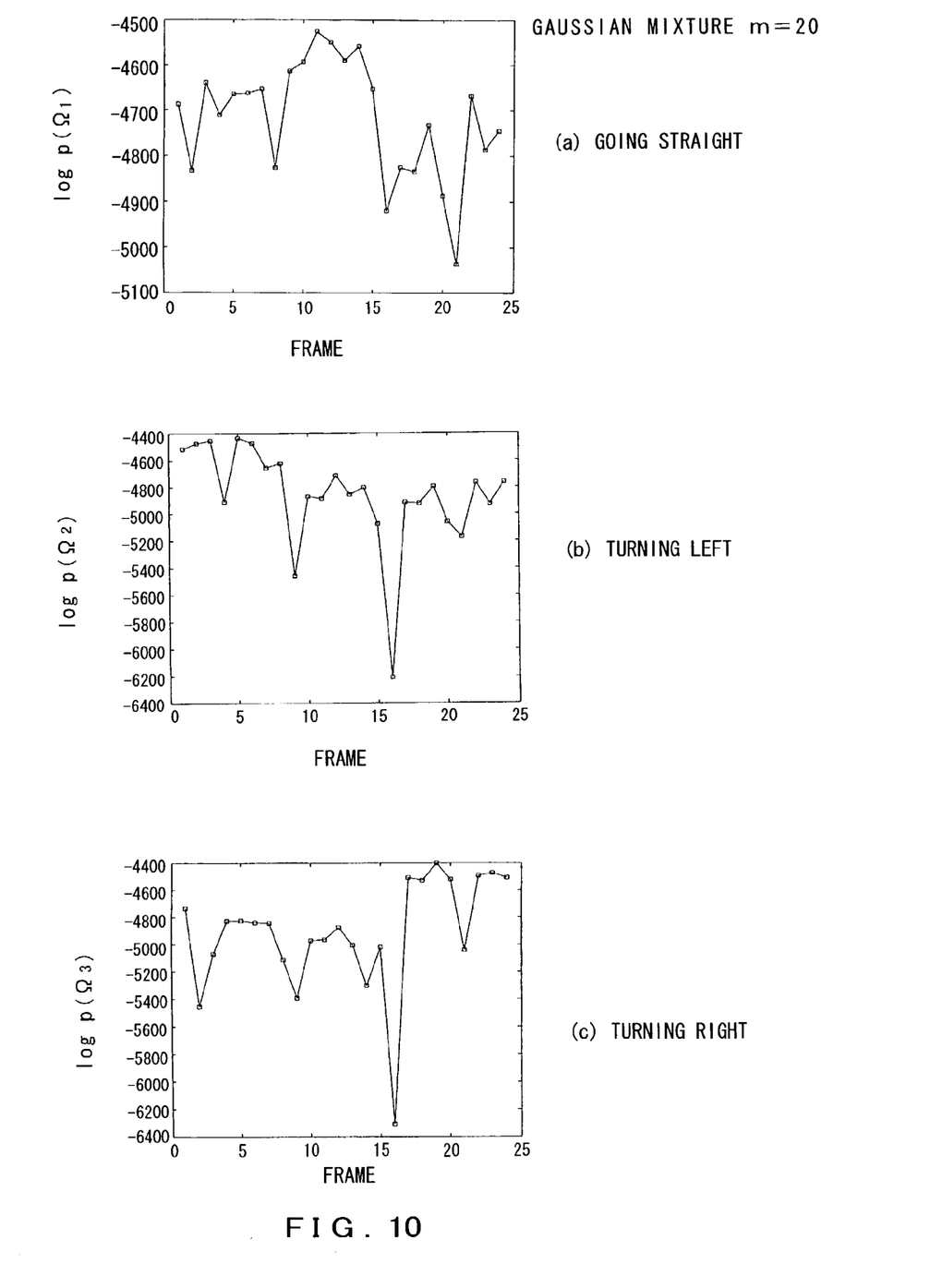
FIG. 10 show recognition result of behavior of RC car with gaussian mixture m=20.
Figure 11:
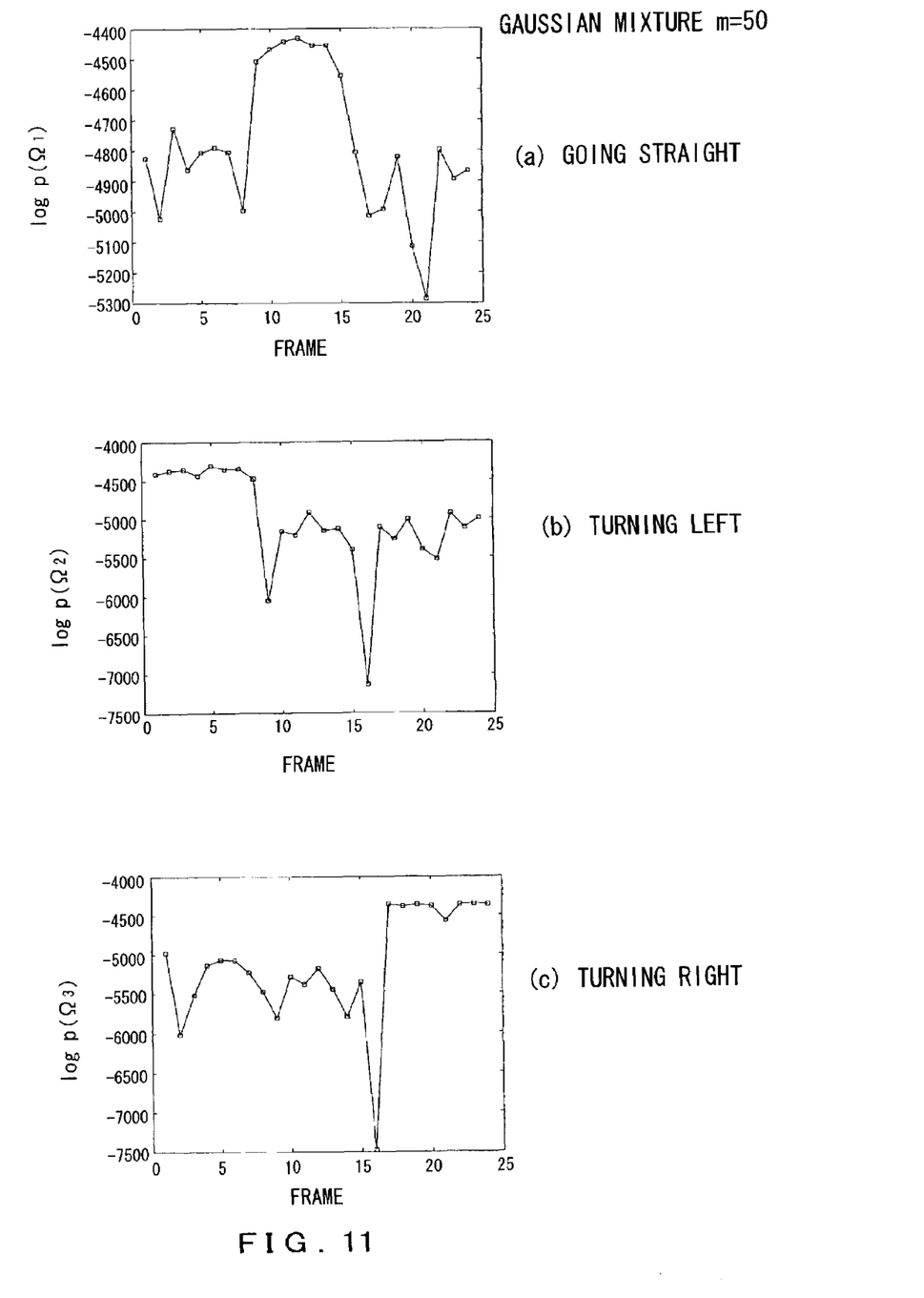
FIG. 11 show recognition result of behavior of RC car with gaussian mixture m=50.

FIGS. 10 show graphs of logarithmic likelihood of confidence with 24 frames of image according to the Eq. (7) and (8) with applied number of Gaussian mixtures m=20 when the RC car 100 goes straight and then turns left/right. FIGS. 11 show the same with m=50. In FIG. 10 and FIGS. 11, upper graphs (a) show logarithmic likelihood of confidence for attention class for behavior command l=1, middle graphs (b) show logarithmic likelihood of confidence for attention class for behavior command l=2, and lowest graphs (c) shows logarithmic likelihood of confidence for attention class for behavior command l=3. Horizontal axis of each graph shows 24 frames of image on which behavioral recognition is performed. First 8 frames (frame 1-8) correspond to the images acquired during behavior command l=2 is given to the RC car 100 (when the RC car turns left), middle 8 frames (frame 9-16) to the images acquired during behavior command l=1 is given to the RC car 100 (when the RC car goes straight), and last 8 framess (frame 17-24) corresponds to the images acquired during behavior command l=3 is given to the RC car 100 (when the RC car turns right).

Referring to FIG. 10, in graph (a), middle eight frames (when going straight) show largest logarithmic likelihood. In graph (b), first eight frames (when turning left) show largest logarithmic likelihood, and in graph (c) last eight images (when going right) show largest logarithmic likelihood. However, variation of logarithmic likelihood between frames is so large that recognition of behavior is not sufficient.

Referring to FIG. 11, similar to FIG. 10, frames corresponding to behavior command show largest logarithmic likelihood. However, comparing to FIG. 10, the variation of logarithmic likelihood between frames becomes small and connection is smoother. These advantages are accomplished by incrementing the number of gaussian mixture by attentional modulation.

As described above, the image recognizing apparatus according to the invention improves the reliability by repeating learning in attention class generated in bottom-up fashion in the advance learning part. In the behavior recognizing part, recognizing accuracy of behavior is improved because learning result is updated until logarithmic likelihood of confidence excesses the predetermined value.

According to the invention, instead of recognizing the behavior of mobile unit based only on images, the image recognizing apparatus pre-learned the relationship between images and behavior commands and determines the behavior using the learning result. Therefore, it can recognize the behavior of the mobile unit rapidly and accurately in real application.

Although it has been described in details in terms of specific embodiment according to the invention, it is not intended to limit the invention to such specific embodiment. Those skilled in the art will appreciate that various modifications can be made without departing from the scope of the invention.

What is claimed is:

1. An apparatus for recognizing images, comprising:
   a) behavior command output means for outputting behavior commands to cause a mobile unit to move;
   b) local feature extraction means for extracting local features from image of external environment captured by said mobile unit when said mobile unit moves according to said behavior command, said local feature extraction means:
      b1) capturing two temporally consecutive images,
      b2) applying Gabor filters to the two images in plural directions with respect to each of a plurality of local areas produced by segmenting a total area of the image, thereby determining a magnitude of optical flow of said two images in each direction of the Gabor filter, and
      b3) extracting local feature data for each of said local areas by determining probability density distribution for the direction having the largest optical flow in each local area;
   c) global feature extraction means for extracting feature of global area of said image using said extracted features of said local areas; and
   d) learning means for calculating probability models to recognize behavior of the mobile unit based on said extracted feature of said global area.

2. The apparatus according to claim 1, wherein said local feature extraction means extracts said local features from the image by utilizing said optical flow obtained by applying both positive and negative component of Gabor filters on two images.

3. The apparatus according to claim 2, wherein each of said Gabor filters is applied on one of eight different directions respectively.

4. The apparatus according to claim 1, wherein said learning means calculates said probability models utilizing expectation maximization algorithm and supervised learning with the use of neural network.

5. The apparatus according to claim 4, further comprising behavioral recognition means for applying Bayes' rule with use of said probability model on an image acquired afresh, said behavioral recognition means calculating confidence for each of said behavior commands to recognize behavior of said mobile unit.

6. An apparatus for recognizing images, comprising:
behavior command output means for outputting behavior commands to cause a mobile unit to move;
local feature extraction means for extracting features of local areas within an image of external environment acquired on said mobile unit when said behavior command is output;
global feature extraction means for combining said extracted features of said local areas into global feature of global area of said image with the use of a predetermined function;
learning means for calculating probability models by utilizing expectation maximization algorithm and supervised learning with the use of neural network based on said global feature;
behavioral recognition means for applying Bayes' rule with use of said probability model on an image acquired afresh and calculating confidence for each of said behavior commands to recognize behavior of said mobile unit;
wherein said behavioral recognition means selects one confidence having largest value among the plurality of confidence;
behavioral assessment means for comparing said selected confidence with a predetermined value to assess said recognized behavior;
wherein said behavioral recognition means recognizing the behavior corresponding to the selected confidence as the behavior of said mobile unit if said confidence is resulted to be larger than the predetermined value;
attention generation means for generating attentional demanding which demands to cause said probability model to be updated if said confidence is resulted to be equal or smaller than the predetermined value; and
attentional modulation means for changing the number of Gaussian mixture in an equation of said learning means for calculating said probability models in response to said attentional demanding;
wherein said learning means recalculates said probability model after said parameter has been changed.

7. A method for recognizing images in computing system, comprising:
a) outputting behavior commands to cause a mobile unit to move;
b) extracting local features from images of external environment captured by said mobile unit when said mobile unit moves according to said behavior command, comprising;
b1) capturing two temporally consecutive images;
b2) applying Gabor filters to the two images in plural directions with respect to each of a plurality of local areas produced by segmenting a total area of the image, thereby determining a magnitude of optical flow of said two images in each direction of the Gabor filter, and
b3) extracting local feature data for each of said local areas by determining probability density distribution for the direction having the largest optical flow in each local area;
c) extracting feature of global area of said image using said extracted features of said local areas; and
d) calculating probability models to recognize behavior of the mobile unit based on said extracted feature of said global area.

8. The method according to claim 7, wherein said step of extracting local features from images uses said optical flow obtained by applying both positive and negative components of the Gabor filter to the two images.

9. The method according to claim 8, wherein each of said Gabor filters is applied on one of eight different directions respectively.

10. The method according to claim 7, wherein said step of calculating the probability models includes utilizing expectation maximization algorithm and supervised learning with the use of neural network.

11. The method according to claim 10, further comprising:
applying Bayes' rule with use of said probability models on an image acquired afresh; and
calculating confidence for each of said behavior commands to recognize behavior of said mobile unit.

12. A method for recognizing images in computing system, comprising:
outputting behavior commands to cause a mobile unit to move;
extracting features of local areas within an image of external environment acquired on said mobile unit when said behavior command is output;
combining said extracted features of said local areas into global feature of global area of said image with the use of a predetermined function;
calculating probability models by utilizing expectation maximization algorithm and supervised learning with the use of neural network based on said global feature;
applying Bayes' rule with use of said probability model on an image acquired afresh and calculating confidence for each of said behavior commands to recognize behavior of said mobile unit;
selecting one confidence having largest value among the plurality of confidence for said comparing step;
comparing said selected confidence with a predetermined value to assess said recognized behavior;
recognizing the behavior corresponding to the selected confidence as the behavior of said mobile unit if said confidence is resulted to be larger than the predetermined value;
generating attentional demanding which demands to cause said probability model to be updated if said confidence is resulted to be equal or smaller than the predetermined value; and
changing the number of Gaussian mixture in an equation of said calculating step for calculating said probability models in response to said attentional demanding;
wherein said probability model is recalculated after said parameter has been changed.

13. An apparatus for recognizing images, comprising:
a) behavior command output means for outputting behavior commands to cause a mobile unit to move;
b) local feature extraction means for extracting local features from image of external environment captured by said mobile unit when said mobile unit moves according to said behavior command, said local feature extraction means:
b1) capturing two temporally consecutive images,
b2) applying Gabor filters to the two images in plural directions with respect to each of a plurality of local areas produced by segmenting a total area of the image, thereby determining image intensity in each direction of the Gabor filter, and b3) extracting local feature data for each of said local areas by determining probability density distribution for the direction having the largest image intensity in each local area;

c) global feature extraction means for extracting feature of global area of said image using said extracted features of said local areas; and d) learning means for calculating probability models utilizing expectation maximization algorithm and supervised learning with the use of neural network to recognize behavior of the mobile unit based on said extracted feature of said global area;

e) behavioral recognition means for applying Bayes' rule with use of said probability model on an image acquired afresh, said behavioral recognition means calculating confidence for each of said behavior commands to recognize behavior of said mobile unit;

f) behavioral assessment means for comparing said confidence with a predetermined value to assess said recognized behavior;

g) attention generation means for generating attentional demanding which demands to cause said probability models to be updated based on the result of said assessment; and h) attentional modulation means for changing specified parameter of said learning means in response to said attentional demanding;

wherein said learning means recalculates said probability model after said parameter has been changed.

14. The apparatus according to claim 13, wherein said behavioral recognition means selects one confidence having largest value among the plurality of confidences and supplies it to said behavioral assessment means, said behavioral recognition means recognizing the behavior corresponding to the selected confidence as the behavior of said mobile unit if said confidence is resulted to be larger than the predetermined value by said comparing by said behavioral assessment means.

15. The apparatus according to claim 14, wherein said parameter is the number of Gaussian mixture in an equation of said learning means for calculating said probability models.

16. A method for recognizing images in computing system, comprising:

a) outputting behavior commands to cause a mobile unit to move;

b) extracting local features from images of external environment captured by said mobile unit when said mobile unit moves according to said behavior command, comprising;

b1) capturing two temporally consecutive images;

b2) applying Gabor filters to the two images in plural directions with respect to each of a plurality of local areas produced by segmenting a total area of the image, thereby determining image intensity in each direction of the Gabor filter, and b3) extracting local feature data for each of said local areas by determining probability density distribution for the direction having the largest image intensity in each local area;

c) extracting feature of global area of said image using said extracted features of said local areas;

d) calculating probability models utilizing expectation maximization algorithm and supervised learning with the use of neural network to recognize behavior of the mobile unit based on said extracted feature of said global area;

applying Bayes' rule with use of said probability models on an image acquired afresh;

calculating confidence for each of said behavior commands to recognize behavior of said mobile unit;

comparing said confidence with a predetermined value to assess said recognized behavior;

generating attentional demanding which demands to cause said probability models to be updated based on the result of said assessment; and changing specified parameter of said learning step in response to said attentional demanding;

wherein said probability model is recalculated after said parameter has been changed.

17. The apparatus according to claim 16, further comprising:

subsequent to said step of calculating confidence, selecting one confidence having largest value among the plurality of confidences for said comparing step, recognizing the behavior corresponding to the selected confidence as the behavior of said mobile unit if said confidence is resulted to be larger than the predetermined value in said comparing step.

18. The method according to claim 17, wherein said parameter is the number of Gaussian mixture in an equation of said calculating step for calculating said probability models.

* * * * *